(12) United States Patent
Ham

(10) Patent No.: US 12,402,005 B2
(45) Date of Patent: Aug. 26, 2025

(54) WIRELESS INTRUSION PREVENTION SYSTEM, WIRELESS NETWORK SYSTEM COMPRISING SAME, AND METHOD FOR OPERATING WIRELESS NETWORK SYSTEM

(71) Applicant: SECUI CORPORATION, Seoul (KR)

(72) Inventor: Seong Yun Ham, Gyeonggi-do (KR)

(73) Assignee: SECUI CORPORATION, Seoul (KR)

( * ) Notice: Subject to any disclaimer, the term of this patent is extended or adjusted under 35 U.S.C. 154(b) by 399 days.

(21) Appl. No.: 17/908,958

(22) PCT Filed: Apr. 3, 2020

(86) PCT No.: PCT/KR2020/004571
§ 371 (c)(1),
(2) Date: Sep. 2, 2022

(87) PCT Pub. No.: WO2021/182667
PCT Pub. Date: Sep. 16, 2021

(65) Prior Publication Data
US 2023/0099706 A1 Mar. 30, 2023

(30) Foreign Application Priority Data
Mar. 11, 2020 (KR) .................. 10-2020-0030422

(51) Int. Cl.
*H04W 12/12* (2021.01)
*H04W 12/06* (2021.01)
*H04W 48/02* (2009.01)

(52) U.S. Cl.
CPC .......... *H04W 12/12* (2013.01); *H04W 12/06* (2013.01); *H04W 48/02* (2013.01)

(58) Field of Classification Search
CPC ..... H04W 12/12; H04W 12/06; H04W 48/02; H04W 12/121; H04L 63/1483; H04K 3/86; H04K 2203/18
See application file for complete search history.

(56) References Cited

U.S. PATENT DOCUMENTS 10,326,689 B2 * 6/2019 Liu .................. H04W 40/16
2005/0037733 A1 * 2/2005 Coleman ............ H04L 63/1416
455/411

(Continued)

FOREIGN PATENT DOCUMENTS

JP  2007174287 A  7/2007
JP  2010532106 A  9/2010

(Continued)

OTHER PUBLICATIONS

Office Action on the Japanese Patent Application No. 2022-554777 issued by the Japanese Patent Office on Aug. 22, 2023.

(Continued)

*Primary Examiner* — Abiy Getachew
(74) *Attorney, Agent, or Firm* — IP & T GROUP LLP

(57) ABSTRACT

Provided herein are a wireless intrusion prevention system, a wireless network system including the wireless intrusion prevention system, and a method for operating the wireless network system. Of these, the wireless intrusion prevention system includes an access point, a plurality of stations configured to transmit/receive a wireless frame to/from the access point over a wireless network, and a wireless intrusion prevention system configured to monitor the wireless frame, wherein the wireless intrusion prevention system transmits a dis-association request to a specific station, among the plurality of stations, and prevents the access point from responding to the specific station.

20 Claims, 16 Drawing Sheets

(56) References Cited

U.S. PATENT DOCUMENTS

| | | | |
|---|---|---|---|
| 2006/0150250 A1* | 7/2006 | Lee | H04L 63/1416 726/23 |
| 2007/0275741 A1* | 11/2007 | Bian | H04W 12/128 455/466 |
| 2008/0123553 A1* | 5/2008 | Boyina | H04W 24/04 370/254 |
| 2014/0157364 A1 | 6/2014 | Lee et al. | |
| 2018/0324200 A1 | 11/2018 | Choi et al. | |

FOREIGN PATENT DOCUMENTS

| | | | |
|---|---|---|---|
| JP | 2013157969 | A | 8/2013 |
| JP | 2016541158 | A | 12/2016 |
| JP | 2018511282 | A | 4/2018 |
| KR | 10-2006-0070309 | | 6/2006 |
| KR | 10-2013-0004172 | | 1/2013 |
| KR | 10-2014-0058336 | A | 5/2014 |
| KR | 20140058306 | A | 5/2014 |
| KR | 10-2017-0062301 | A | 6/2017 |
| KR | 10-2019-0018354 | A | 2/2019 |
| KR | 20190018354 | A | 2/2019 |
| WO | 2011030466 | A1 | 3/2011 |

OTHER PUBLICATIONS

Office Action for Chinese Patent Application No. 202080097599.9 issued by the Chinese Patent Office on Feb. 22, 2025.

\* cited by examiner

WIRELESS INTRUSION PREVENTION SYSTEM, WIRELESS NETWORK SYSTEM COMPRISING SAME, AND METHOD FOR OPERATING WIRELESS NETWORK SYSTEM

This application is a national stage application of PCT/KR2020/004571 filed on Apr. 3, 2020, which claims priority of Korean patent application number 10-2020-0030422 filed on Mar. 11, 2020. The disclosure of each of the foregoing applications is incorporated herein by reference in its entirety.

TECHNICAL FIELD

The present disclosure relates to a wireless intrusion prevention system (WIPS), a wireless network system including the wireless intrusion prevention system, and a method for operating the wireless network system.

BACKGROUND ART

With the rapid development and propagation of the Internet, network environments have expanded, and the form of the Internet has become more complicated due to easy and convenient network access to the Internet and various types of services provided via the Internet. However, due to various types of network attacks, such as viruses, hacking, system intrusion, acquisition of system administrator privileges, concealment of intrusion, and denial of service attacks performed over the Internet, the Internet is always exposed to the risk of hacking, thus increasing the Internet infringements, gradually increasing the scale of damage to public institutions, social infrastructure, and financial institutions, and also increasing the influence thereof. In order to solve such Internet security problems, the need for network security technology, such as antivirus programs, firewalls, integrated security management, and intrusion detection systems, has come to the fore.

A wireless network system for wireless Internet communication includes a wireless Local Area Network (LAN) Access Point (AP) and a wireless LAN station. An AP is used by installing a piece of equipment called an access point device.

Recently, an integrated network system using wired and wireless networks has been widely developed and applied. It is difficult to reliably block harmful traffic arriving in a wired manner, but it is more difficult to reliably block harmful traffic arriving in a wireless manner. In order to solve this, a Wireless Intrusion Prevention System (WIPS) is under continual development. The WIPS is a system which detects and blocks a wireless intrusion, such as an unauthorized (rouge) AP or a Denial of Service (DoS) attack, through wireless section monitoring.

DISCLOSURE

Technical Problem

Various embodiments of the present disclosure are directed to a WIPS, which blocks access by a specific station when the specific station accesses an AP through a protected deauthentication frame, as in the case of, for example, IEEE 802.11w technology, and a wireless network system including the WIPS.

The objects of the present disclosure are not limited to the above-described object, and other objects, not described here, may be clearly understood by those skilled in the art from the following description.

Technical Solution

A wireless network system according to an embodiment of the present disclosure to accomplish the above object may include an access point, a plurality of stations configured to transmit/receive a wireless frame to/from the access point over a wireless network, and a wireless intrusion prevention system configured to monitor the wireless frame, wherein the wireless intrusion prevention system transmits a dis-association request to a specific station, among the plurality of stations, and prevents the access point from responding to the specific station.

The wireless intrusion prevention system may transmit an interference signal to the access point in order to prevent the access point from responding to the specific station.

The interference signal may include a Clear to Send (CTS) frame or a Request to Send (RTS) frame.

The interference signal may include a signal for increasing a degree of congestion of the access point.

The interference signal may include a spoofed packet.

The spoofed packet may include a frame requesting a new association (Association frame), a frame requesting a re-association (Re-Association frame), or a frame requesting a dis-association for a current associated state (Dis-Association frame).

The specific station may transmit a protected query to the access point in response to the dis-association request.

The specific station may instruct the access point to respond to the protected query within a predetermined first time, and the specific station may terminate an association with the access point when no response is received within the first time.

The specific station may send an authentication request frame to the access point after the association with the access point is terminated.

The wireless intrusion prevention system may send a deauthentication frame to the access point or the specific station after the authentication request frame is sent.

The specific station may be a station connected to an unauthorized station or an unauthorized attacker over a network.

The wireless network may include IEEE 802.11w technology.

A method for operating a wireless network system according to another embodiment of the present disclosure to accomplish the above object may include maintaining, by an access point, an association with a specific station, among a plurality of stations configured to transmit/receive a wireless frame to/from the access point over a wireless network, and transmitting, by a wireless intrusion prevention system configured to monitor the wireless frame, an interference signal in order to prevent the access point from responding to the specific station or to prevent the access point from transmitting a protected query to the specific station.

The method for operating the wireless network system may further include transmitting, by the wireless intrusion prevention system configured to monitor the wireless frame, a dis-association request to the specific station, transmitting, by the specific station, a protected query to the access point, instructing, by the specific station, the access point to respond to the protected query within a predetermined first time, and when no response is received within the first time, terminating, by the specific station, an association with the access point.

The method for operating the wireless network system may further include, after the association with the access point is terminated, sending, by the specific station, an authentication request frame to the access point, and after the authentication request frame is sent, sending, by the wireless intrusion prevention system, a deauthentication frame to the access point or the specific station.

The method for operating the wireless network system may further include transmitting, by the specific station, an access request to the access point, wherein the interference signal includes a signal for preventing the access point from transmitting an access request denial to the specific station or preventing the access point from transmitting the protected query to the specific station.

The method for operating the wireless network system may further include transmitting, by the wireless intrusion prevention system, an access request to the access point, wherein the interference signal includes a signal for preventing the access point from transmitting the protected query to the specific station.

A wireless intrusion prevention system according to an embodiment of the present disclosure to accomplish the above object may include a sensing device configured to monitor a wireless frame that is transmitted/received between an access point and a plurality of stations over a wireless network and to process information based on the wireless frame, and a server configured to determine whether the access point and the plurality of stations are unauthorized and are operating abnormally, based on the processed information, wherein the wireless intrusion prevention system comprises a function of providing an interference signal for terminating an association of a specific station, among the plurality of stations, with the access point.

The wireless intrusion prevention system may further include a function of sending a deauthentication frame to the access point or the specific station when the specific station sends an authentication request frame to the access point so as to request access to the access point.

The interference signal may include a signal for preventing the access point from responding to the specific station or from transmitting a protected query to the specific station.

Other detailed matters of the embodiments are included in the detailed description and the drawings.

Advantageous Effects

In accordance with embodiments of the present disclosure, when a plurality of stations are associated with an AP through a protected deauthentication frame, as in the case of, for example, IEEE 802.11w technology, an association with the specific station, among the plurality of stations, may be released, and access to the specific station may be blocked.

The effects according to the embodiments are not limited to the foregoing descriptions, and various effects not described herein fall within the scope of the present specification.

MODE FOR INVENTION

Figure 1:
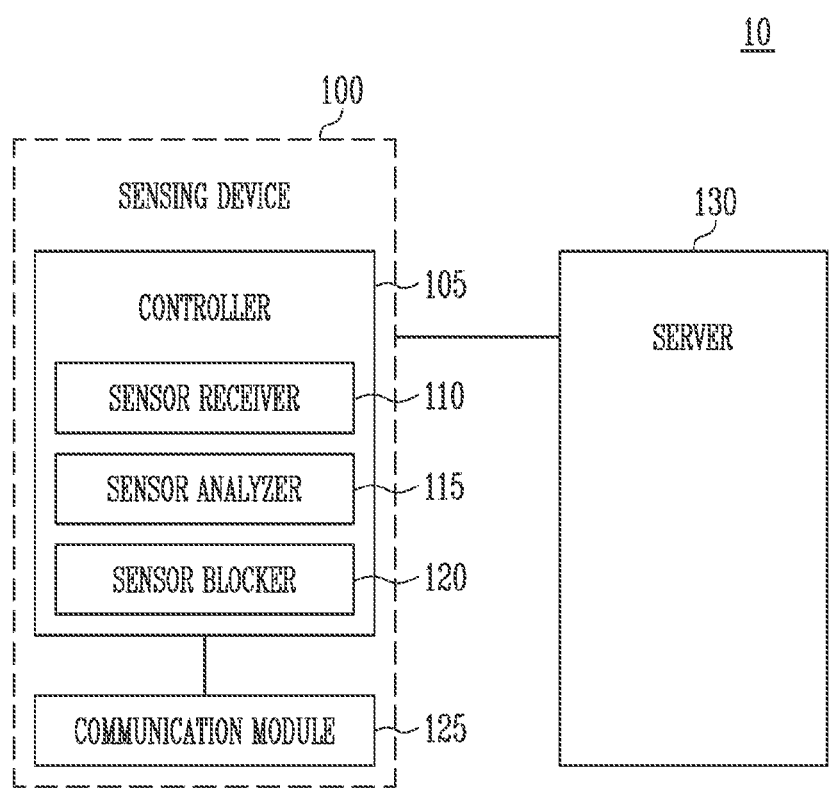
FIG. 1 is a block diagram illustrating the schematic configuration of a WIPS.

Advantages and features of the present disclosure and methods for achieving the same will be clarified with reference to embodiments described later in detail together with the accompanying drawings. However, the present disclosure may be implemented in various forms without being limited to embodiments which will be described later, and the embodiments of the present disclosure are intended to make the disclosure of the inventive concept complete and are provided to help those skilled in the art to which the present disclosure pertains more clearly understand the scope of the present disclosure. The technical scope of the present disclosure should be defined by the technical spirit of the claims.

Although the terms "first" and "second" are used to describe various components, it will be apparent that those components are not limited by the terms. These terms are merely used to distinguish one component from another component. Therefore, it will be apparent that a first component, which will be described below, may also be a second component without departing from the technical spirit of the present disclosure. The singular forms are intended to include the plural forms as well, unless the context clearly indicates otherwise.

A Wireless Intrusion Prevention System (hereinafter referred to as WIPS), which will be described below, is a system for detecting and blocking a wireless intrusion, such as an unauthorized (rouge) Access Point (AP) or a Denial of Service (DoS) attack, through wireless section monitoring.

General wireless networks as described in the present specification may designate wireless networks to which IEEE 802.11 technology is applied, and, among the general wireless networks, a wireless network to which predetermined security technology is applied may designate a wireless network to which IEEE 802.11w technology is applied. IEEE 802.11w is amended technology of IEEE 802.11 for improving the security of management frames. However, the present disclosure is not limited thereto, and it will be apparent that embodiments of the present disclosure may be applied to a wireless network to which various security technologies are applied.

The wireless network system includes one or more Basic Service Sets (BSS), each of which refers to a set of devices that are successfully synchronized with each other to be capable of communicating with each other. Generally, BSS may be divided into an infrastructure BSS and an Independent BSS (IBSS).

An Access Point (hereinafter referred to as AP) is an entity which provides access to a distribution system via a wireless medium for stations associated therewith. An AP is used as a concept including a Personal BSS Coordination Point (PCP), and may include, in a broad sense, all of concepts of a centralized controller, a base station (BS), a node-B, a Base Transceiver System (BTS), or a site controller. In the present disclosure, an AP may be designated as a base wireless communication station, and the base wireless communication station may be used, in a broad sense, as the term including all of an AP, a base station, an eNodeB (eNB), and a transmission point (TP). In addition, the base wireless communication station may include various types of wireless communication stations which allocate communication medium resources and perform scheduling in communication with a plurality of wireless communication stations.

A station may be any device including media access control (MAC) complying with the specification of an IEEE 802.11 standard and a physical layer interface for wireless media, and may include, in a broad sense, an access point (AP) as well as a non-access point (non-AP) station. In the present specification, 'station' refers to a non-AP station, but may be used as the term referring both to a non-AP station and to an AP in accordance with an embodiment. The station for wireless communication may further include a processor and a transmit/receive unit, and may further include a user interface unit, a display unit, etc. according to an embodiment. The processor may generate a frame to be transmitted over a wireless network or process a frame received over the wireless network, and may additionally perform various types of processing for controlling the station. Also, the transmit/receive unit may be functionally coupled to the processor, and may transmit/receive, for the station, frames over the wireless network. The station may transmit/receive a frame to/from the AP over the wireless network.

Hereinafter, embodiments of the present disclosure will be described with reference to the attached drawings. The same or similar reference numerals are used to designate the same components throughout the drawings.

FIG. 1 is a block diagram illustrating the schematic configuration of a WIPS.

Referring to FIG. 1, a WIPS 10 may include a sensing device 100 and a server 130. Meanwhile, an enterprise network over which a wireless network service and a sensing device may be configured at the same time may further include an AP controller if necessary.

An operation in which the WIPS 10 determines a blocking policy may be as follows.

For example, the sensing device 100 may monitor a wireless frame, and may process information, such as the MAC address, security configuration content, frame appearance frequency, transfer rate, amount of data, SSID, IEEE 802.11 a/b/g/n, a channel, and an RSSI of a station or AP that transmitted the wireless frame, based on the monitored wireless frame. Furthermore, the sensing device 100 may transmit the processed information to the server 130.

The server 130 may determine whether the corresponding station or AP is unauthorized and whether the corresponding station or AP is operating abnormally by comparing the processed information with signature information stored in a database (DB). In this case, the signature may include header information of the wireless frame or information about frame occurrence frequency.

The server 130 may determine whether the detected AP is unauthorized for two cases. The server 130 may determine whether the detected AP is unauthorized based on an SSID, a MAC address, or additional information stored in the DB, or may determine the detected AP to be an unauthorized AP if the corresponding AP is not connected to an in-house wired network. In this case, whether the corresponding AP is connected to the in-house wired network may be determined in various manners. An unauthorized station may be determined in a similar manner.

When it is determined that the corresponding AP has been unauthorized or that the corresponding AP is an abnormally operating AP or station, the server 130 may perform automatic blocking based on a blocking policy, or may raise an alarm so that an administrator performs manual blocking. The server 130 may transmit a blocking target list or blocking policy information to the sensor device 100 based on a blocking determination.

The sensor device 100 may select an AP and a station to be blocked depending on a determination based on the blocking target list and the blocking policy, and may perform blocking.

For example, the blocking by the sensing device 100 based on the blocking target list and the blocking policy may have the following types.

In an example, the blocking by the sensing device 100 may include AP blocking. Here, when the BSSID of a blocking target AP is detected, the sensing device 100 may block all of stations that access the AP, rather than blocking a specific station.

In another example, the blocking by the sensing device 100 may include station blocking. Here, when a corresponding station is determined to be an unauthorized station or it is detected that the corresponding station is masquerading as an authorized station, the sensing device 100 may block the corresponding station. When the MAC of the corresponding station appears, the sensing device 100 may block access by the corresponding station to all APs.

In a further example, the blocking by the sensing device 100 may include specific AP-station blocking. Here, when an authorized station is associated with an unauthorized AP or when an unauthorized station is associated with an authorized AP, the sensing device 100 may block the association. When the MAC of the corresponding station appears, the sensing device 100 may block access only to a designated AP, but may not be involved in access to other APs.

For example, the sensing device 100 may include a controller 105 and a communication module 125.

The communication module 125 may monitor a wireless frame, and may send a blocking message to a station and an AP when generating the blocking message.

The controller 105 may generate a blocking message related to a wireless frame received as the result of monitoring based on policy information and a blocking list related to wireless intrusion prevention. Furthermore, the controller 105 may control the generated blocking message to be sent to an AP and a station designated to transmit/receive the wireless frame.

For example, the controller 105 may include a sensor receiver 110, a sensor analyzer 115, and a sensor blocker 120.

The sensor receiver 110 may monitor a wireless frame in a plurality of channels by controlling the communication module 125.

The sensor analyzer 115 may analyze the wireless frame received as a result of the monitoring, and may add/update information of the AP or station that transmitted the wireless frame. The sensor analyzer 115 may determine whether the AP or the station has violated a blocking policy based on a blocking target list and the blocking policy, and may then generate a blocking event. The sensor analyzer 115 may transfer the generated blocking event to the server 130.

The sensor blocker 120 may execute the generated blocking event. The sensor blocker 120 may generate the blocking message and send the blocking message to the AP and the station designated to transmit/receive the wireless frame.

For example, when an AP and a station are associated with each other, the sensor blocker 120 may perform blocking by generating a deauthentication frame and transmitting it to the AP and the station. The sensor blocker 120 may set address from which a deauthentication frame is transmitted as the BSSID of the AP, may set the address at which the deauthentication frame is received as the MAC address of the station, may generate the deauthentication frame, and may transmit the deauthentication frame to the station. Furthermore, the sensor blocker 120 may set an address from which a deauthentication frame is transmitted as the MAC address of the station, may set an address at which the deauthentication frame is received as the BSSID of the AP, may generate the deauthentication frame, and may transmit the deauthentication frame to the AP. Each of the AP and the station that received the deauthentication frame from the sensing device 100 may determine that a counterpart transmitted the deauthentication frame providing notification of association termination, and may stop the connection therebetween.

Figure 2:
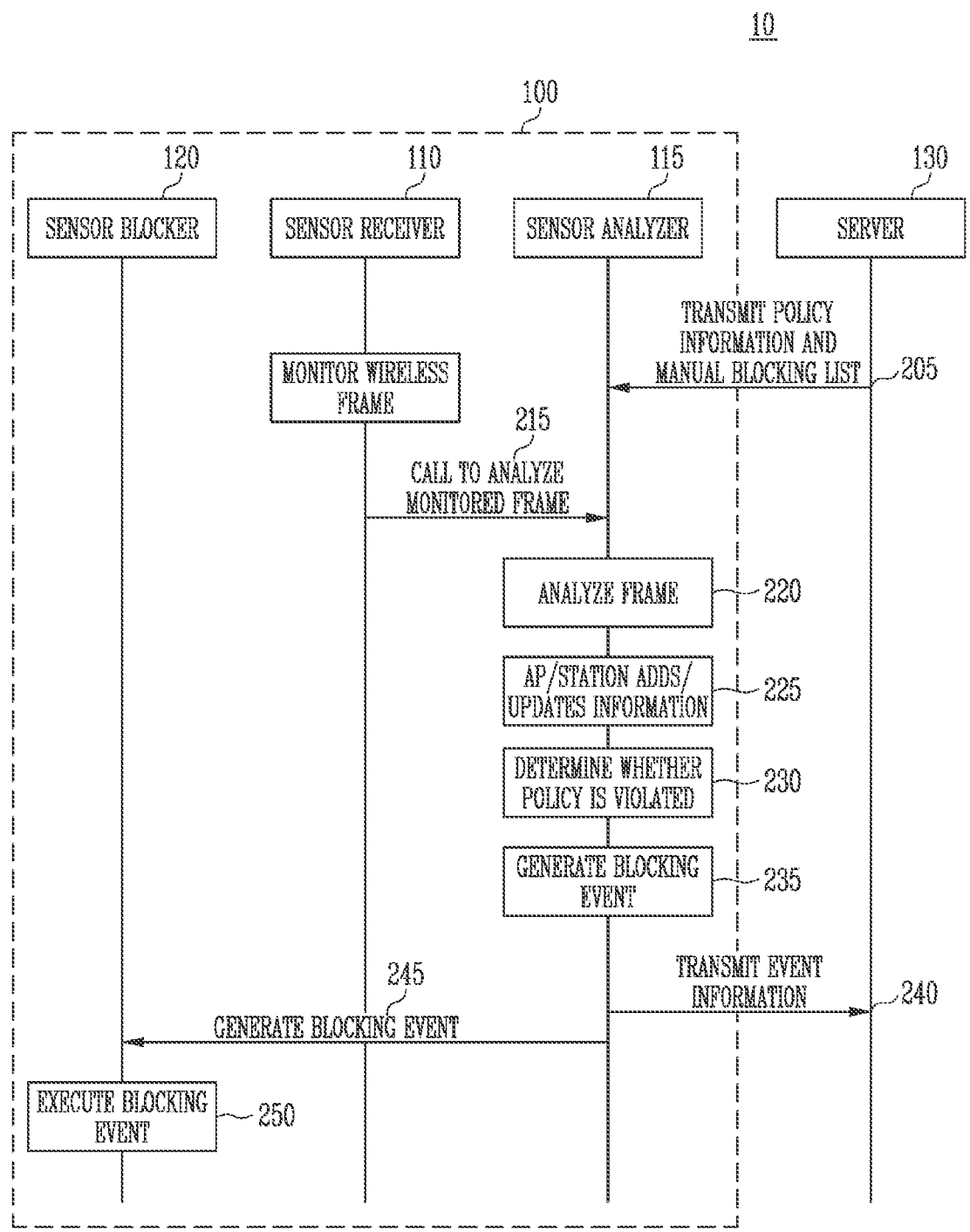
FIG. 2 is a flowchart illustrating an access prevention method by a WIPS.

FIG. 2 is a flowchart illustrating an access blocking method by a WIPS.

At step 205, a server 130 may transmit policy information and a blocking list related to wireless intrusion prevention to the sensing device 100.

At step 210, a sensor receiver 110 may monitor a wireless frame in a plurality of channels. When a wireless frame is received as a result of the monitoring, the sensor receiver 110 may call the sensor analyzer 115 to analyze the corresponding wireless frame at step 215.

The sensor analyzer 115 may analyze the corresponding wireless frame at step 220, and may add or update information about the AP or station that transmitted the corresponding wireless frame at step 225. Furthermore, at step 230, it may be determined whether the corresponding AP or station has violated a policy. When it is determined that a policy has been violated, the sensor analyzer 115 may generate a blocking event at step 235. The sensor analyzer 115 may transfer the generated blocking event information to the server 130 at step 240.

At step 245, when the generation of the blocking event is transferred to the sensor blocker 120, the sensor blocker 120 may execute the blocking event at step 250. For example, as described above, the sensor blocker 120 may generate a deauthentication frame and transmit the deauthentication frame to the AP and the station designated to transmit/receive the wireless frame.

Figure 3:
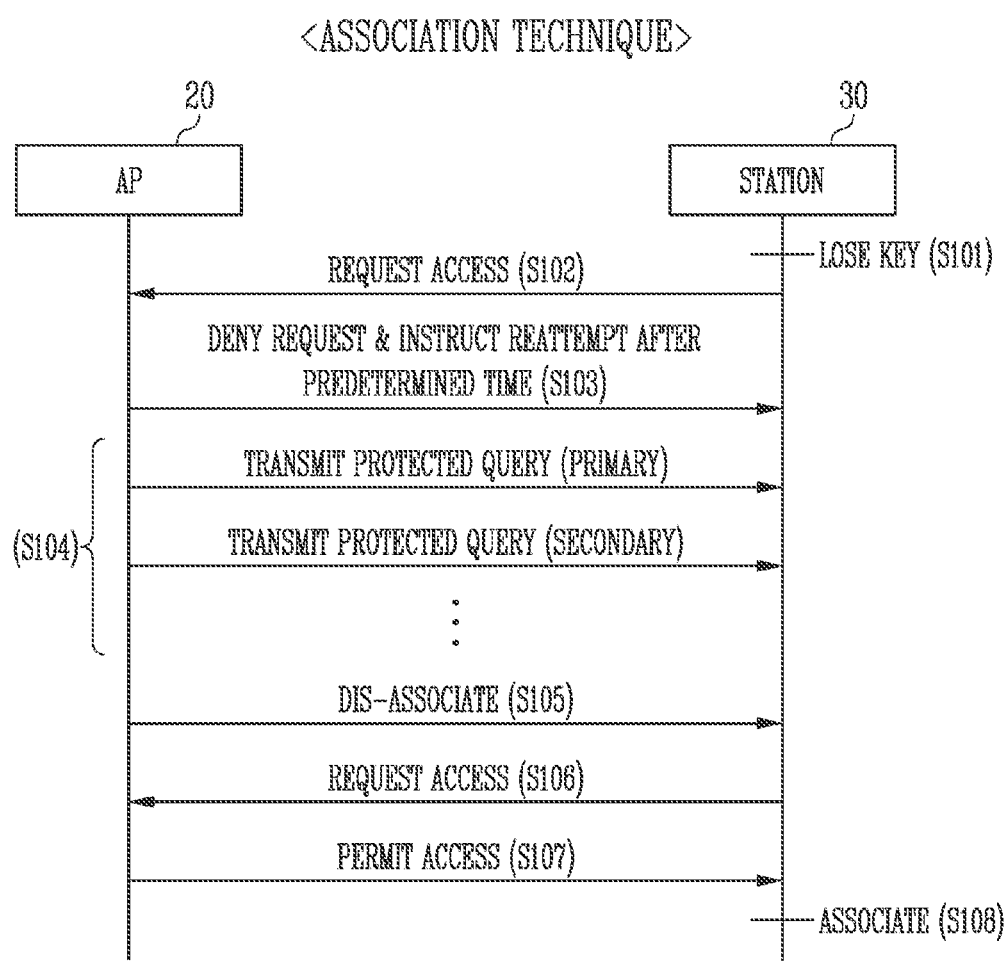
FIG. 3 is a conceptual diagram for explaining an association technique in a wireless intrusion prevention system according to an embodiment of the present disclosure.

FIG. 3 is a conceptual diagram for explaining an association technique in a wireless intrusion prevention system according to an embodiment of the present disclosure.

In the following drawings, individual steps moving downwards over time are illustrated in each drawing.

For example, the association technique may be performed when the station 30 loses an encryption key.

Referring to FIG. 3, while the AP 20 and the station 30 are associated with each other, the station 30 may lose an encryption key for a specific reason (S101). For example, the specific reason may include reset, rebooting or the like of the station 30. Here, the station 30 may be in a state in which the encryption key is lost (S101).

In the state in which the encryption key is lost, the station 30 may request access to the AP 20 (3102). In this case, because the station 30 has lost all encryption keys, it may transmit an unprotected access request frame to the AP 20.

Because the AP 20 determines that the station 30 still maintains a valid association using an encryption key, the AP 20 denies the access request from the station 30, and may instruct the station 30 to reattempt access after a predetermined first time (3103).

Thereafter, the AP 20 may perform a check so as to determine whether such an access request (S102) is an attack (S104). In an embodiment, a mechanism for the check (S104) may include a Security Association (SA) query step. For example, the SA query step may further include the step of transmitting, by the AP 20, at least one Protected Security Association Query to the station 30.

In the case where the station 30 does not respond before a response time (second time) of the station 30 predefined at the SA query step, elapses, the AP 20 may transmit disassociation to the existing station 30 (S105), and may discard the encryption key that is no longer valid.

After the first time has elapsed, the station 30 may transmit a (re)access request frame to the AP 20 (S106). Thereafter, the AP 20 may permit access by the station 30 (3107), and the AP 20 and the station 30 may be associated with each other (S108).

Figure 4:
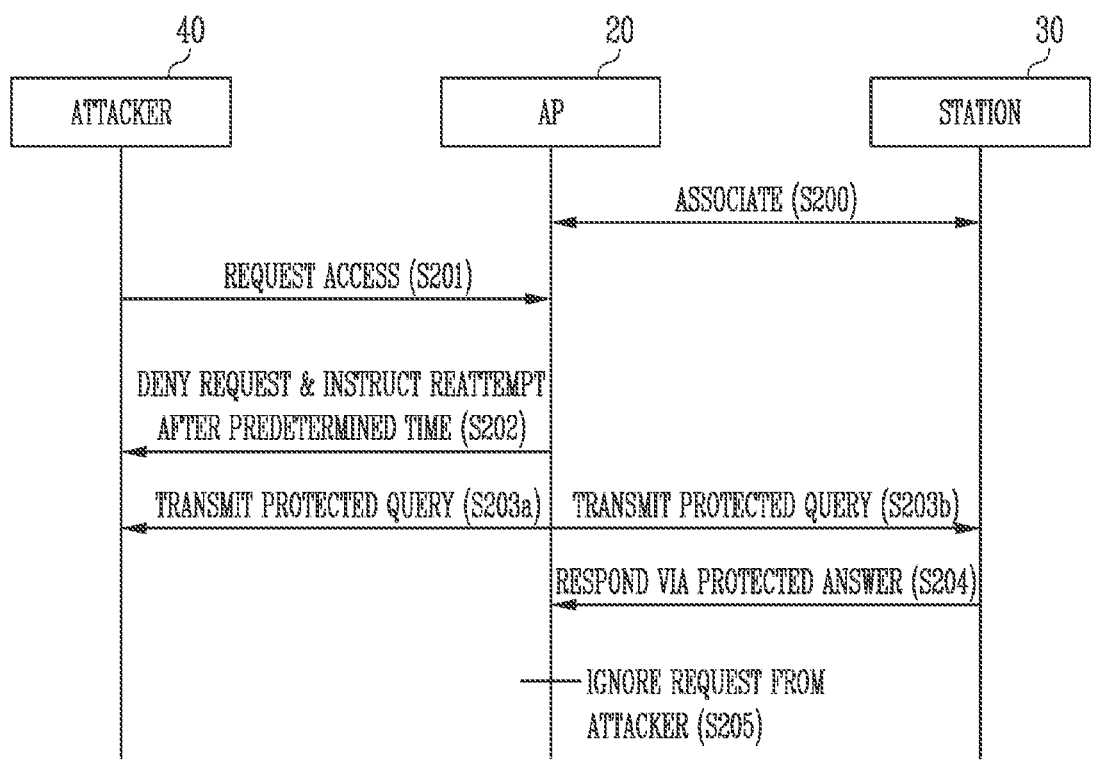
FIG. 4 is a conceptual diagram for explaining an association defense technique in a wireless intrusion prevention system according to an embodiment of the present disclosure.

FIG. 4 is a conceptual diagram for explaining an association defense technique in a wireless intrusion prevention system according to an embodiment of the present disclosure.

For example, the association defense technique may be performed when an attacker attempts to access the AP 20.

Referring to FIG. 4, the AP 20 and the station 30 may be associated with each other (S200). An attacker 40 may request access to the AP 20 (S201). Here, the attacker 40 may be an unauthorized station and a station 30 controlled from outside, and may include a station 30 or the like regarded as a substantially unauthorized station.

Because the AP 20 determines that the station 30 still maintains a valid association using the encryption key, the AP 20 may deny the access request from the attacker 40, and may instruct the attacker 40 to reattempt access after a predetermined third time (S202).

Thereafter, the AP 20 may perform a check so as to determine whether such an access request is an attack. The AP 20 may individually transmit a protected query to the attacker 40 and the station 30 (S203a and 3203b). In an embodiment, the AP 20 may transmit the protected query to the attacker 40 and the station 30 simultaneously, but the time at which (sequence in which) to transmit the protected query is not limited thereto.

The station 30 may respond to the AP 20 via a protected answer in response to the protected query (S204).

The AP 20 may determine that the request from the attacker 40 is a spoofed association request, and may ignore the access request from the attacker 40 (S205).

Figure 5:
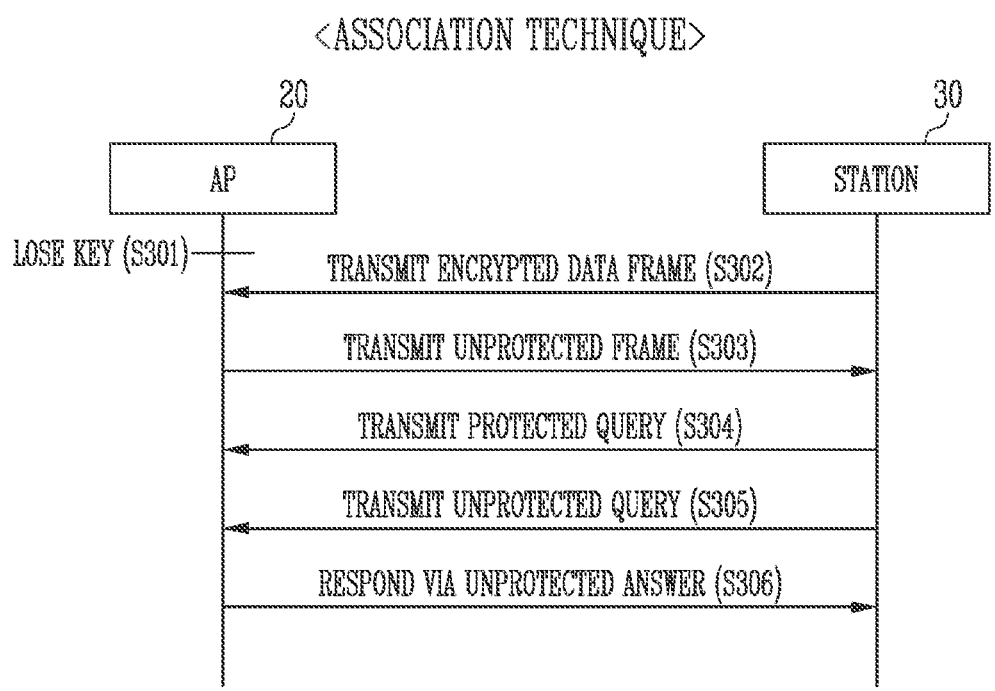
FIG. 5 is a conceptual diagram for explaining an association technique in a wireless intrusion prevention system according to an embodiment of the present disclosure.

FIG. 5 is a conceptual diagram for explaining an association technique in a wireless intrusion prevention system according to an embodiment of the present disclosure.

For example, the association technique may be performed when the AP 20 loses an encryption key.

Referring to FIG. 5, while the AP 20 and the station 30 are associated with each other, the AP 20 may lose an encryption key for a specific reason (S301). For example, the specific reason may include reset, rebooting or the like of the AP 20. Here, the station 20 may be in a state in which the encryption key is lost (S301).

When the previously associated station 30 transmits an encrypted data frame to the AP (S302), the AP 20 may reattempt an association by transmitting an unprotected frame to the station 30 (S303). Because the station 30 still includes the encryption key and determines that a valid association with the AP 20 is maintained, the station 30 may perform a check to determine whether the association attempt by the AP 20 is an attack. In an embodiment, a mechanism for the check may include a Security Association (SA) query step. For example, the SA query step may further include the step of transmitting, by the station 30, at least one protected query (SA query) to the AP (S304).

When the AP 20 cannot respond to the protected query even after a predetermined fourth time has elapsed, the station 30 may determine that the association with the AP 20 is released, and may discard an invalid encryption key with the AP 20.

Thereafter, when the station 30 transmits an unprotected query to the AP 20 (S305) and the AP 20 responds to the station 30 via an unprotected answer in response to the unprotected query (S306), the AP 20 and the station 30 may be associated with each other.

Figure 6:
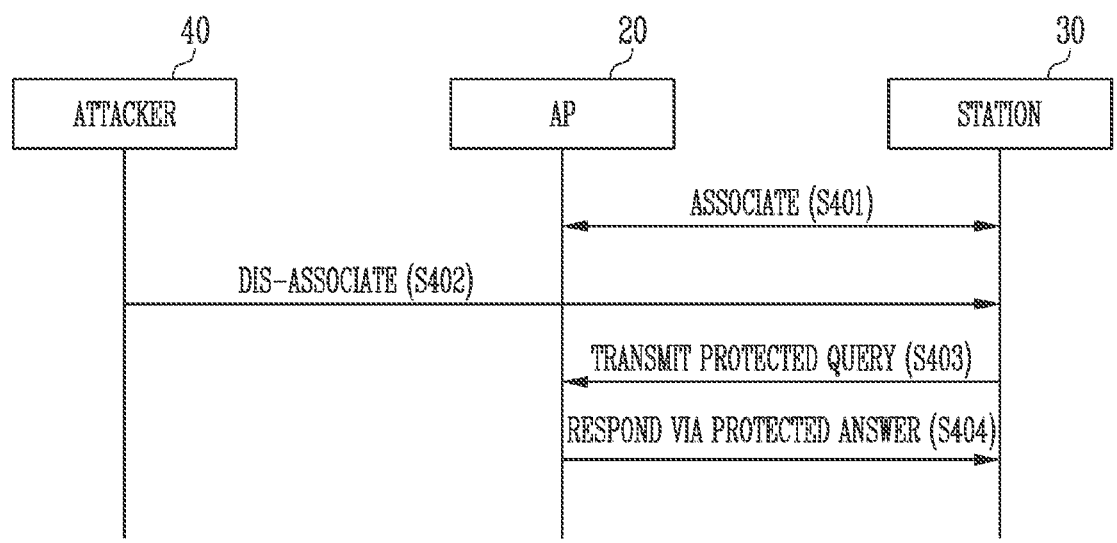
FIG. 6 is a conceptual diagram for explaining a dis-association defense technique in a wireless intrusion prevention system according to an embodiment of the present disclosure.

FIG. 6 is a conceptual diagram for explaining a dis-association defense technique in a wireless intrusion prevention system according to an embodiment of the present disclosure.

For example, the dis-association defense technique may be performed in order to provide defense in the case where an attacker 40 releases an association with the station 30 that accesses the AP 20.

Referring to FIG. 6, the AP 20 and the station 30 may remain associated with each other (S401).

In relation thereto, the attacker 40 may request dis-association from the station 30 so as to dis-associate the station 30 from the AP 20 (S402). In accordance with an embodiment, the attacker 40 may transmit the above-described dis-association request to a plurality of stations 30 associated with the AP 20 so as to dis-associate the plurality of stations 30 from the AP 20 (S402).

Each station 30 may perform a check so as to determine whether the dis-association request from the attacker 40 is an attack in response to the dis-association request (S402). The station 30 may transmit at least one protected query to the AP 20 (S403). Because the association between the AP 20 and the station 30 remains valid, the AP 20 may respond to the station 30 via a protected answer (S404).

By means of this, the station 30 may determine that the dis-association request from the attacker 40 is an attack, may ignore the dis-association request from the attacker 40, and may maintain the association with the AP 20.

Figure 7:
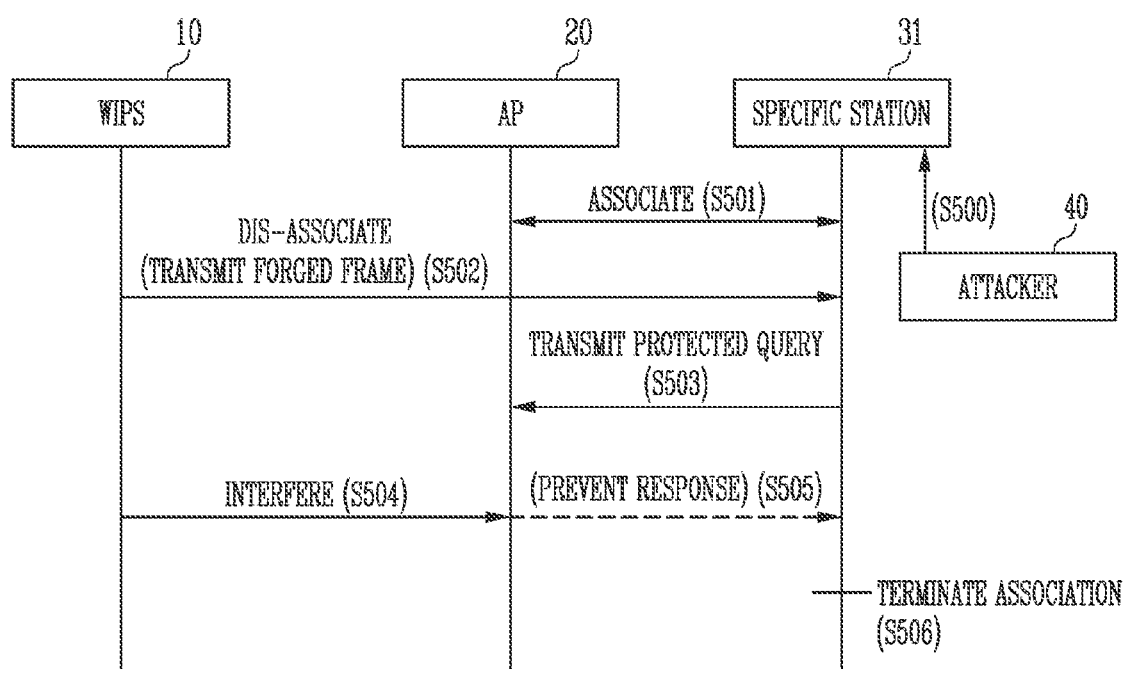
FIG. 7 is a conceptual diagram for explaining a specific station dis-association technique in a wireless intrusion prevention system according to an embodiment of the present disclosure.

FIG. 7 is a conceptual diagram for explaining a specific station dis-association technique in a wireless intrusion prevention system according to an embodiment of the present disclosure.

For example, a technique for dis-association from the specific station 31 may be performed in the case in which it is desired to dis-associate an unauthorized specific station 31, or to dis-associate a specific station 31, which is controlled by an attacker 40 and can be regarded as a substantially unauthorized station, among a plurality of stations associated with the AP 20, as illustrated in the drawing. In the present specification, the term 'specific station 31' refers to at least some stations 30 targeted for dis-association, among the plurality of stations 30 associated with the AP 20. In an embodiment, the specific station 31 may be associated with the attacker 40 over the network.

Referring to FIG. 7, a wireless network system may include an AP 20, stations 30 including a specific station 31, and a WIPS 10.

The AP 20 may be associated with the plurality of stations 30, and an association between the AP 20 and the specific station 31 may be maintained (S501). In accordance with an embodiment, the specific station 31 may be an unauthorized station, or may include a station 30 that is controlled by the attacker 40 (S500) and can be regarded as a substantially unauthorized station.

In an embodiment, the WIPS 10 may transmit a dis-association request to the plurality of stations 30 associated with the AP 20. In this case, the dis-association request may also be transmitted to the specific station 31 (S502). The dis-association request (S502) may include a forged frame. For example, the forged frame may include a spoofed frame such as a frame requesting new association (Association frame), a frame requesting re-association (Re-Association frame), or a frame requesting dis-association for the current associated state (Dis-Association frame).

Accordingly, the specific station 31 may perform a check so as to determine whether the received request for dis-association from the AP 20 (S502) is an attack. That is, the specific station 31 may reattempt to mutually authenticate with the AP 20. The specific station 31 may transmit a protected query to the AP 20 (S503). In accordance with an embodiment, the specific station 31 may perform transmission of the protected query to the AP 20 a plurality of times (S503).

In this case, the WIPS 10 may interfere with the response of AP 20 to the specific station 31. For such interfering (S504), the WIPS 10 may transmit an interference signal to the AP 20 and/or the specific station 31. Although the AP 20 should respond to the protected query transmitted from the specific station 31, the AP 20 may be prevented (3505) from responding to the specific station 31 due to the interfering (S504).

Consequently, the specific station 31 may be dis-associated from the AP 20 after a predetermined fifth time because it does not receive a response from the AP 20 within the predetermined fifth time. Accordingly, the specific station 31 may terminate the association with the AP 20 (S506).

Hereinafter, the interference signal transmitted at the interfering step (S504) will be described in detail with reference to FIGS. 8 and 9. Hereinafter, in the description of FIGS. 8 and 9, repeated descriptions of the same components as those in FIG. 7 are omitted, and identical or similar reference numerals are used.

Figure 8:
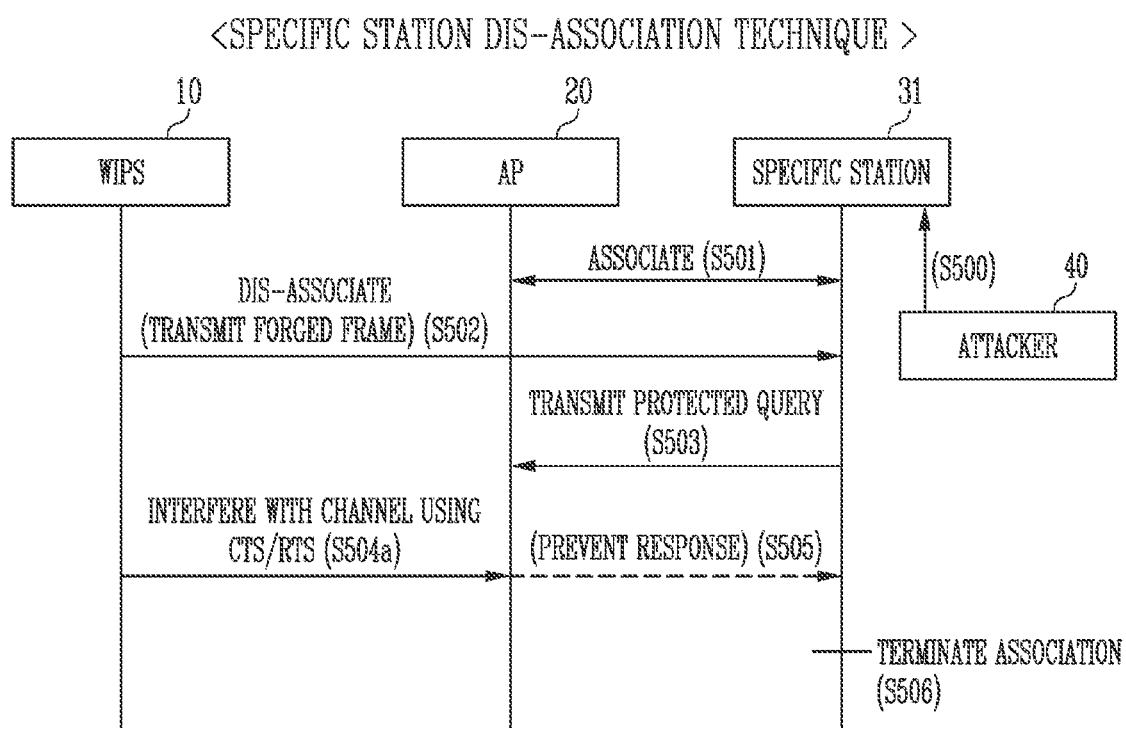
FIGS. 8 and 9 illustrate modifications of FIG. 7, and are conceptual diagrams for explaining a specific station dis-association technique.
Figure 9:
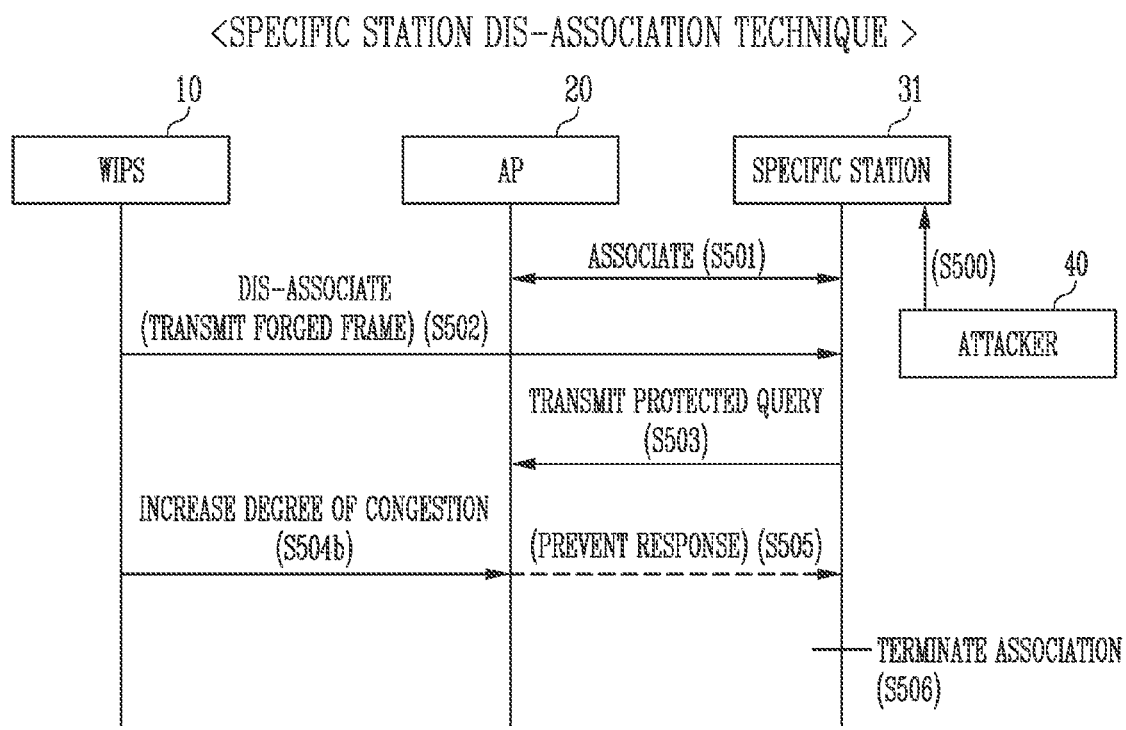

FIGS. 8 and 9 illustrate modifications of FIG. 7, and are conceptual diagrams for explaining a specific station dis-association technique.

Referring to FIG. 8, the WIPS 10 may interfere with a channel by transmitting a CST frame and/or an RTS frame in order to prevent the AP 20 from responding to the specific station 31 (S504a).

The station, which performs wireless LAN communication, checks whether the channel is in a busy state by performing carrier sensing before transmitting data. When a wireless signal having a certain strength or more is sensed, it is determined that the corresponding channel is in a busy state, and the station delays access to the corresponding channel. This process is called Clear Channel Assessment (CCA), and the level at which it is determined whether the corresponding signal is sensed is called a CCA threshold. When a wireless signal equal to or greater than a CCA threshold, received by the station, has the corresponding station as a receiver, the station processes the received wireless signal. On the other hand, when no wireless signal is sensed in the corresponding channel, or when a wireless signal having a strength less than the CCA threshold is sensed, it may be determined that the channel is in an idle state.

When it is determined that the channel is in an idle state, each station having data to be transmitted performs a back-off procedure after a time such as InterFrame Space (IFS) conforming to the situation of the station, for example, Arbitration IFS (AIFS) or Point Coordination function (PCF) IFS (PIFS). According to an embodiment, the AIFS may be used as a component for replacing an existing DCF IFS (DIFS). Each station is waiting while reducing a number of slot times identical to a random number, assigned to the corresponding station, during an interval corresponding to the idle state of the channel, and a station having exhausted all of the slot times attempts to access the corresponding channel. An interval during which respective stations perform back-off procedures in this way is referred to as a contention window interval.

If the station successfully accesses the channel, the corresponding station may transmit data through the channel. However, when the station attempting access conflicts with another station, the conflicting stations are respectively assigned new random numbers to again perform back-off procedures. According to an embodiment, the random number newly assigned to each station may be determined within a range twice as broad as the range of random numbers previously assigned to the corresponding station. Meanwhile, each station attempts access by again performing a back-off procedure in the next contention window interval, wherein each station performs a back-off procedure from a slot time left in the previous contention window interval. Stations that perform wireless LAN communication using this method may avoid conflicting with each other for a specific channel.

The stations contend with each other for the right to transmit data. When data transmission at the previous step is completed, each station having data to be transmitted performs a back-off procedure while reducing a back-off counter (or a back-off timer) for the random number assigned thereto after the time corresponding to AIFS has elapsed. The station for which the back-off counter has expired provides notification that that the corresponding station has data to be transmitted by sending a Request to Send (RTS) frame. The RTS frame includes information about a receiver address, a transmitter address, and a duration. After the AP 20 that received the RTS frame waits for the time corresponding to Short IFS (SIMS), it may notify the specific station 31 that data transmission is possible by sending a Clear to Send (CTS) frame. The CTS frame includes information such as a receiver address and a duration. Here, the receiver address of the CTS frame may be set the same as the transmitter address of the RTS frame corresponding thereto, that is, the address of the specific station 31.

The AP 20 that received the CTS frame transmits data after the time corresponding to SIFS has elapsed. When data transmission is completed, the AP 20 provides notification that data transmission has been completed by sensing a response (ACK) frame after the time corresponding to SIFS has elapsed. When a response frame is received within a preset time, the transmitter station considers that data transmission has succeeded. When a response frame is not received within the preset time, the transmitter station considers that data transmission has failed. Meanwhile, neighboring stations 30 having received at least one of the RTS frame and the CTS frame during the transmission process set a Network Allocation Vector (NAV), and do not perform data transmission until the set NAV expires. Here, the NAV of each station may be set based on a duration field of the received RTS frame or CTS frame.

In an embodiment, the specific station 31 may transmit a protected query to the AP 20 (S503), and may instruct the AP 20 to respond within a predetermined sixth time.

In an embodiment, the WIPS 10 may collect protected queries transmitted from the specific station 31 to the AP 20 (S503). In accordance with the collected queries, the WIPS 10 may send a CST frame and/or an RTS frame to the AP 20 and/or the specific station 31 (S504a).

Although the AP 20 should respond to the protected query received from the specific station 31 within the sixth time, it receives the CST frame and/or the RTS frame from the WIPS 10, and thus the AP 20 may not perform data transmission until the set NAV expires. That is, the AP 20 may be prevented from responding to the specific station 31 within the sixth time (S505). Accordingly, the specific station 31 may determine that the dis-association request transmitted from the WIPS 10 (S502) is correct, and may terminate the association with the AP 20 (S506).

Referring to FIG. 9, the WIPS 10 may interfere with a channel by increasing the degree of congestion of the AP 20 and/or the specific station 31 (S504b) in order to prevent the AP 20 from responding to the specific station 31.

In an embodiment, the WIPS 10 may collect protected queries transmitted from the specific station 31 to the AP 20 (S503), and may increase the degree of congestion of the AP 20 and/or the specific station 31 in accordance with the collected queries (S504b). For example, the WIPS 10 may generate a large number of spoofed packets including a frame requesting a new association (Association frame), a frame requesting re-association (Re-Association frame) or a frame requesting dis-association from the current associated state (Dis-Association frame), so the degree of congestion is increased when protected queries are transmitted (S503), thus causing failure of mutual authentication between the AP 20 and the specific station 31. Also, for example, the WIPS 10 may increase the degree of congestion using a method of controlling the bit rate of signals transmitted from the AP 20 or controlling a transmission delay time, thus causing failure of mutual authentication between the AP 20 and the specific station 31. That is, the WIPS 10 may increase the degree of congestion of the AP 20 and/or the specific station 31 (S504), thus causing an association between the AP 20 and the specific station 31 established through IEEE 802.11w to be terminated (S506).

Figure 10:
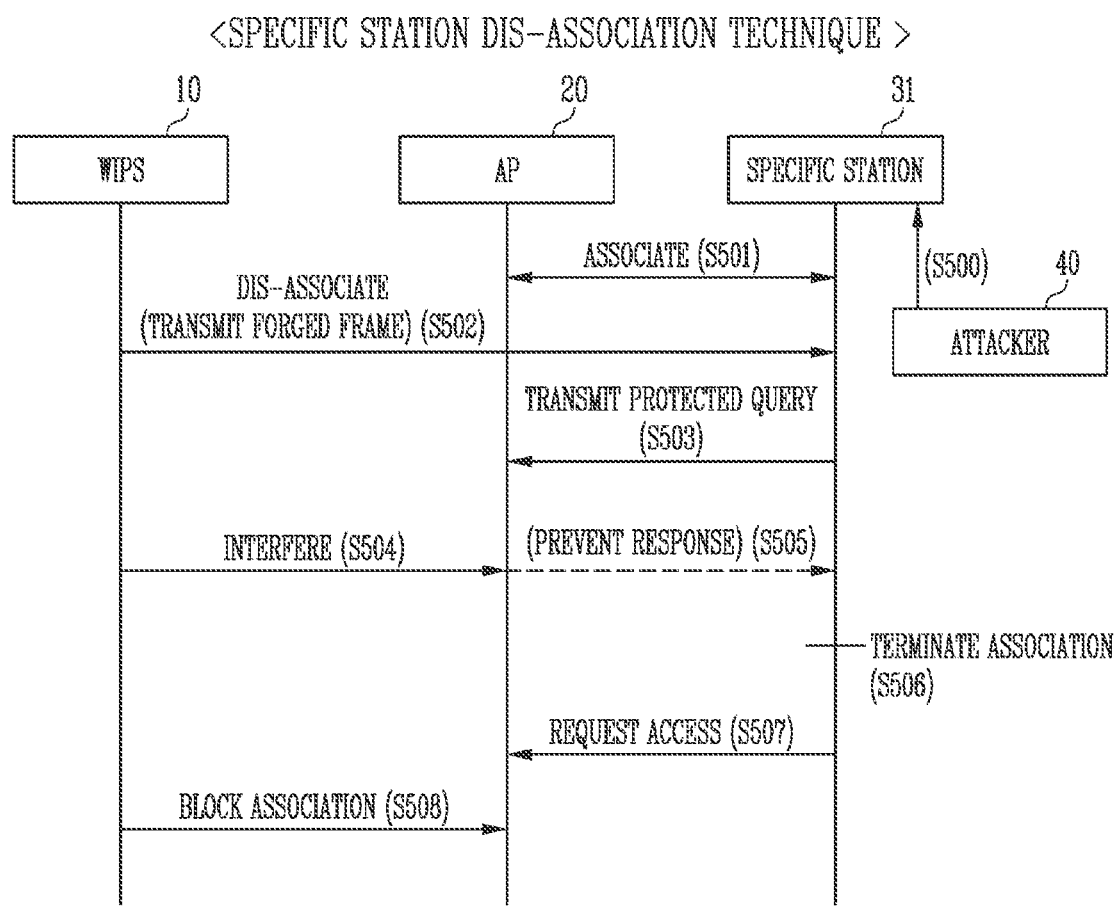
FIG. 10 is a conceptual diagram for explaining a specific station dis-association technique in a wireless intrusion prevention system according to another embodiment of the present disclosure.

FIG. 10 is a conceptual diagram for explaining a specific station dis-association technique in a wireless intrusion prevention system according to another embodiment of the present disclosure.

Referring to FIG. 10, there is a difference from the embodiment of FIG. 7 in that the step in which the WIPS 10 sends an association blocking command to the AP 20 and/or the specific station 31 (S508) is further included.

According to an embodiment, after the association between the specific station 31 and the AP 20 is terminated (S506), the specific station 31 may again request access to the AP 20 (S507). For example, the specific station 31 may send an authentication request frame to the AP 20.

In an embodiment, the WIPS 10 may send a management frame such as a deauthentication frame to the AP 20 and/or the specific station 31 in accordance with the authentication request frame sent from the specific station 31 to the AP 20. Accordingly, the association between the specific station 31 and the AP 20 may fail.

Figure 11:
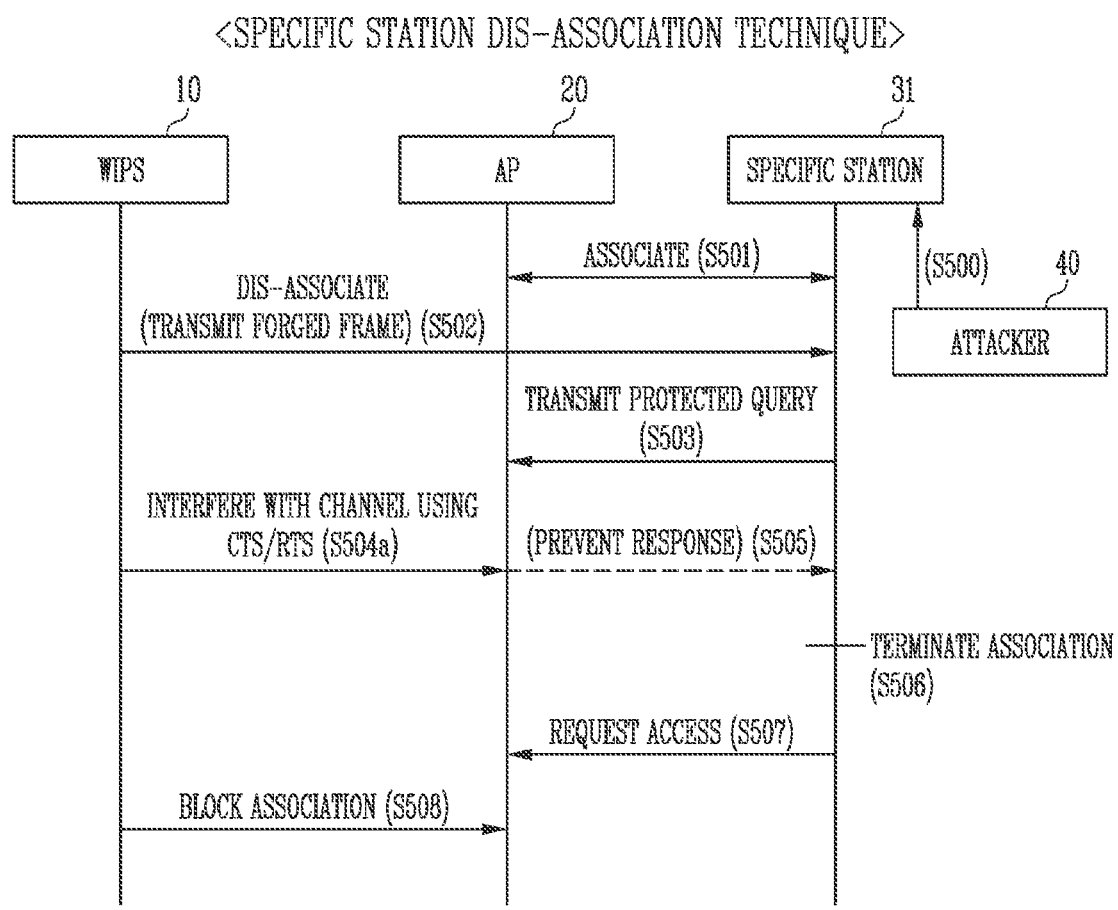
FIGS. 11 and 12 illustrate modifications of FIG. 10, and are conceptual diagrams illustrating the case where the embodiment of FIG. 8 or 9 is additionally applied to the wireless intrusion prevention system.
Figure 12:
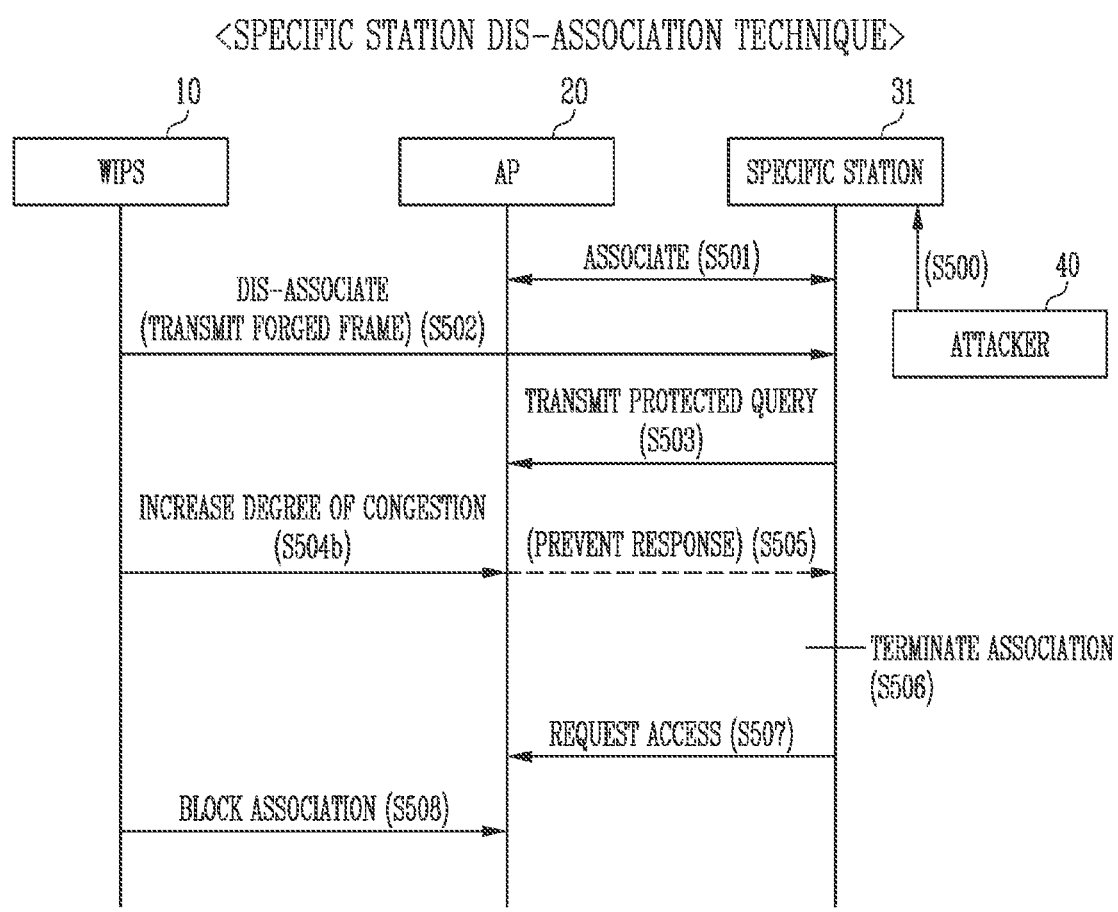

FIGS. 11 and 12 illustrate modifications of FIG. 10, and are conceptual diagrams illustrating the case where the embodiment of FIG. 8 or 9 is additionally applied to the wireless intrusion prevention system.

Referring to FIGS. 11 and 12, the WIPS 10 may interfere with a channel by sensing a CST frame and/or an RTS frame (S504a) or by increasing the degree of congestion of the AP 20 and/or the specific station 31 (S504b) in order to prevent the AP 20 from responding to the specific station 31.

Even if the specific station 31 sends an authentication request frame to the AP 20 after the association between the specific station 31 and the AP 20 is terminated (S506), the WIPS 10 may send an association blocking command, such as a deauthentication frame, to the AP 20 and/or the specific station 31 (S508), thus causing failure of association between the specific station 31 and the AP 20.

Figure 13:
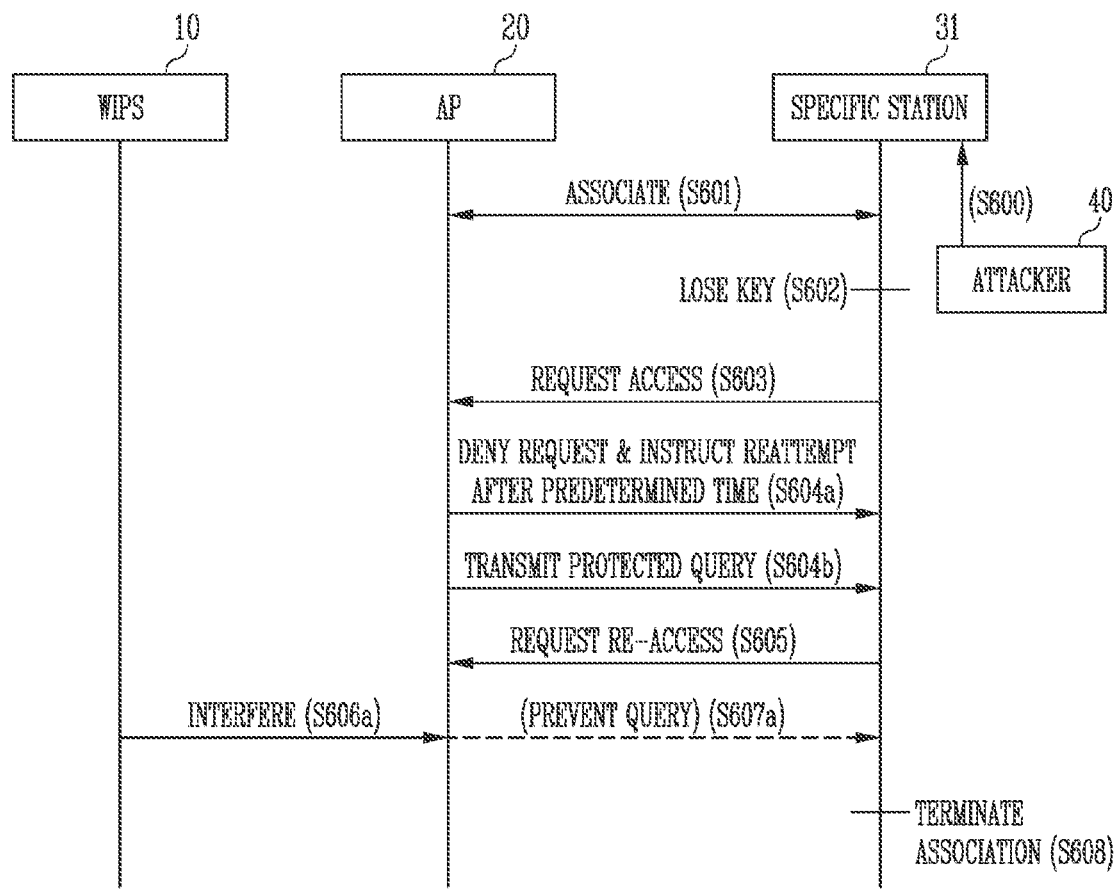
FIGS. 13 to 15 are conceptual diagrams for explaining a specific station dis-association technique in a wireless intrusion prevention system according to a further embodiment of the present disclosure.
Figure 14:
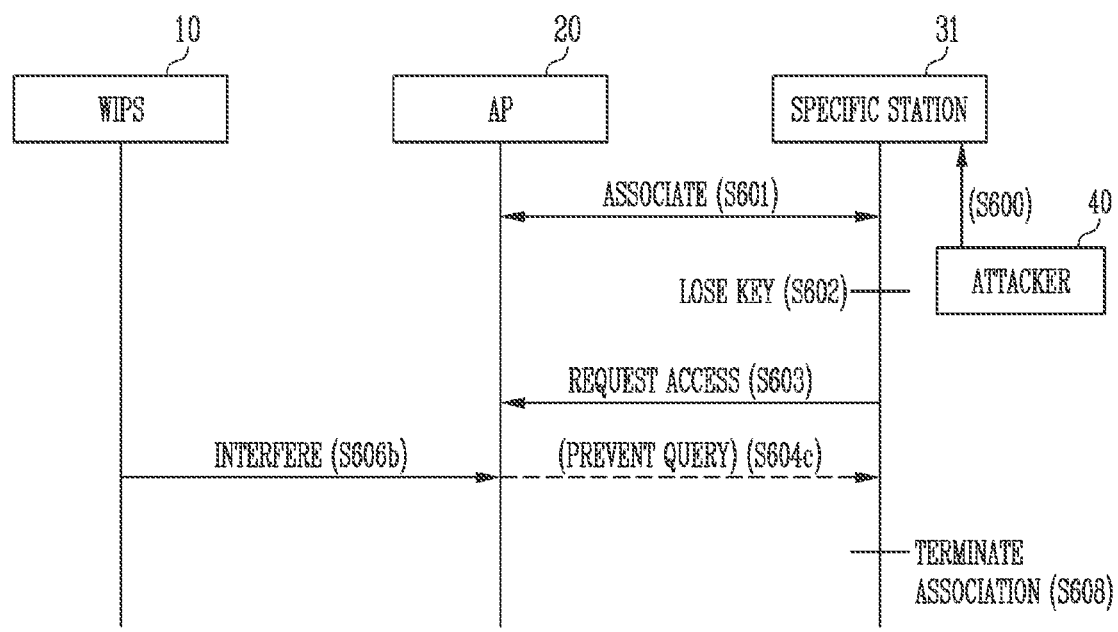
Figure 15:
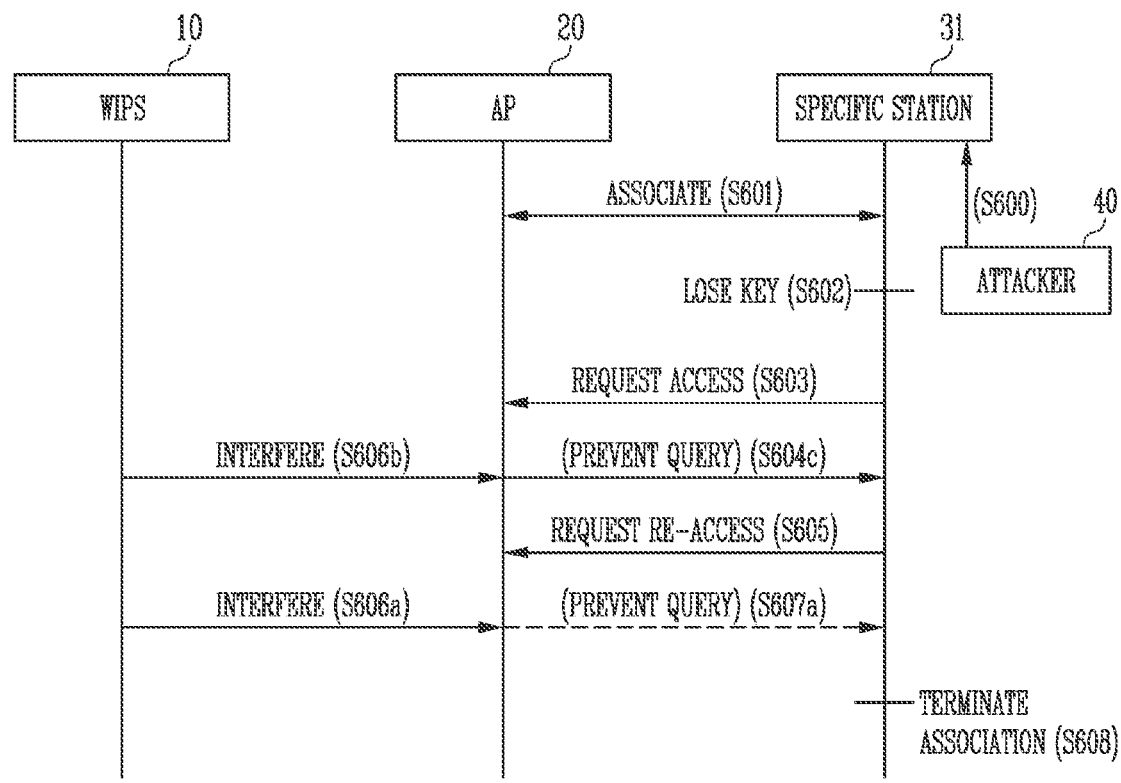

FIGS. 13 to 15 are conceptual diagrams for explaining a specific station dis-association technique in a wireless intrusion prevention system according to a further embodiment of the present disclosure.

First, referring to FIG. 13, while the AP 20 and the specific station 31 are associated with each other (S601), the specific station 31 may lose an encryption key for a specific reason (S101).

In the state in which the encryption key is lost, the specific station 31 may request access to the AP 20 (S603). In this case, because the specific station 31 has lost all encryption keys, it may transmit an unprotected access request frame to the AP 20.

Because the AP 20 determines that the specific station 31 still maintains a valid association using an encryption key, the AP 20 may deny the access request from the specific station 31, and may instruct the specific station 31 to reattempt access after a predetermined seventh time elapses (S604a). In an embodiment, a protected query may be transmitted together with the instruction (S604b).

After the seventh time, the specific station 31 may send a re-access request frame to the AP 20 (S605).

Meanwhile, in an embodiment, the WIPS 10 may interfere with transmission, by the AP 20, of a protected query to the specific station 31 in accordance with the re-access request frame (S606a). For the interfering (S606a), the WIPS 10 may transmit an interference signal to the AP 20 and/or the specific station 31 according to an embodiment. Although the AP 20 should transmit a protected query to the specific station 31 in response to the re-access request frame, it may be prevented from transmitting the protected query to the specific station 31 (S607a) due to the interfering (S606a).

Accordingly, the association between the AP 20 and the specific station 31 may be terminated (S608).

Referring to FIG. 14, in an embodiment, the WIPS 10 may interfere with transmission, by the AP 20, of a protected query to the specific station 31 (S606b) in response to the access request frame (S603). For the interfering (S606b), the WIPS 10 may transmit an interference signal to the AP 20 and/or the specific station 31. The AP 20 should transmit a protected query to the specific station 31 in response to the access request frame, but may be prevented from transmitting a protected query to the specific station 31 (S604c) due to the interfering (S606b). In accordance with an embodiment, the AP 20 may deny the access request from the specific station 31, and may also be prevented from transmitting an instruction to allow the specific station to reattempt access after a predetermined seventh time.

Accordingly, the association between the AP 20 and the specific station 31 may be terminated (S608).

Referring to FIG. 15, in an embodiment, the WIPS 10 may interfere with transmission, by the AP 20, of a protected query to the specific station 31 (S606b) in response to the access request frame (S603). For the interfering (S606b), the WIPS 10 may transmit an interference signal to the AP 20 and/or the specific station 31. Although the AP 20 should transmit a protected query to the specific station 31 in response to the access request frame, it may be prevented from transmitting a protected query to the specific station 31 (S604c) due to the interfering (S606b). In accordance with an embodiment, the AP 20 may deny the access request from the specific station 31, and may also be prevented from transmitting an instruction to allow the specific station to reattempt access after a predetermined seventh time.

Thereafter, the association between the AP 20 and the specific station 31 is not terminated, and the specific station 31 may send a re-access request frame to the AP 20 (S605). In this case, the WIPS 10 may again interfere with transmission, by the AP 20, of a protected query to the specific station 31 in response to the re-access request frame (S606a). For the interfering (S606a), the WIPS 10 may transmit an interference signal to the AP 20 and/or the specific station 31 according to an embodiment. Although the AP 20 should transmit a protected query to the specific station 31 in response to the re-access request frame, it may be prevented from transmitting the protected query to the specific station 31 (S607a) due to the interfering (S606a).

Accordingly, the association between the AP 20 and the specific station 31 may be terminated (S608).

As the interference signal described above with reference to FIGS. 13 to 15, at least one of the interference signals, described above with reference to FIGS. 9 and 10 by way of example, may be applied.

Figure 16:
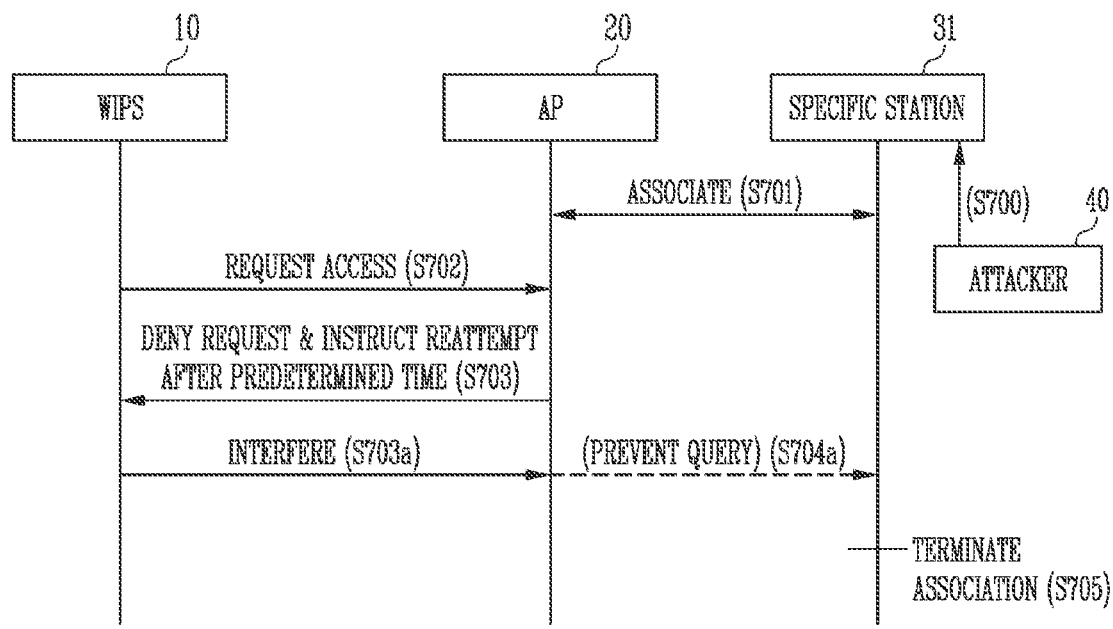
FIG. 16 is a conceptual diagram for explaining a specific station dis-association technique in a wireless intrusion prevention system according to yet another embodiment of the present disclosure.

FIG. 16 is a conceptual diagram for explaining a specific station dis-association technique in a wireless intrusion prevention system according to a further embodiment of the present disclosure.

Referring to FIG. 16, the AP 20 and the specific station 31 may be associated with each other (S701). The WIPS 10 may request access to the AP 20 (S702).

Because the AP 20 determines that the specific station 31 still maintains a valid association using an encryption key, the AP 20 may deny the access request from the WIPS 10, and may instruct the WIPS 10 to reattempt access after a predetermined eighth time elapses (S703).

Thereafter, in order for the AP 20 to perform a check so as to determine whether such an access request is an attack, the AP 20 should individually transmit a protected query to the WIPS 10 and the specific station 31, but the protected query may be blocked by the WIPS 10. In an embodiment, the WIPS 10 may transmit an interference signal to the AP 20 and/or the specific station 31 (S703a). The AP 20 may be prevented from transmitting a protected query to the WIPS 10 and/or the specific station 31 due to the inference signal (S704a).

Accordingly, the association between the AP 20 and the specific station 31 may be terminated (S705).

As the interference signal described above with reference to FIG. 16, at least one of the interference signals described above with reference to FIGS. 9 and 10 by way of example may be applied.

By means of the method described above with reference to FIGS. 7 to 16, the WIPS 10 may release an association with the specific station 31, which is associated with the AP 20 and may be regarded as a substantially unauthorized station. In particular, the WIPS 10 may release the association with a specific station by targeting the specific station, among all stations associated with the AP 20, over the wireless network to which IEEE 802.11w technology is applied.

Although embodiments of the present disclosure have been disclosed, those skilled in the art will appreciate that the present disclosure can be implemented in other concrete forms without departing from the technical spirit or essential features of the disclosure as disclosed in the accompanying claims. Therefore, it should be understood that the above-described embodiments are only exemplary in all aspects rather than being restrictive.

The invention claimed is:

1. A wireless network system, comprising:
   an access point;
   a plurality of stations configured to transmit/receive a wireless frame to/from the access point over a wireless network; and
   a wireless intrusion prevention system configured to monitor the wireless frame,
   wherein the wireless intrusion prevention system transmits a dis-association request to a specific station, among the plurality of stations, and prevents the access point from responding to the specific station when there is a failure of a two-way exchange of protected communications between the specific station and the access point.

2. The wireless network system according to claim 1, wherein the wireless intrusion prevention system transmits an interference signal to the access point in order to prevent the access point from responding to the specific station.

3. The wireless network system according to claim 2, wherein the interference signal includes a Clear to Send (CTS) frame or a Request to Send (RTS) frame.

4. The wireless network system according to claim 2, wherein the interference signal includes a signal for increasing a degree of congestion of the access point.

5. The wireless network system according to claim 4, wherein the interference signal includes a spoofed packet.

6. The wireless network system according to claim 5, wherein the spoofed packet includes a frame requesting a new association (Association frame), a frame requesting a re-association (Re-Association frame), or a frame requesting a dis-association for a current associated state (Dis-Association frame).

7. The wireless network system according to claim 1, wherein the specific station transmits a protected query to the access point in response to the dis-association request.

8. The wireless network system according to claim 7, wherein:
   the specific station instructs the access point to respond to the protected query within a predetermined first time, and
   the specific station terminates an association with the access point when no response is received within the first time.

9. The wireless network system according to claim 8, wherein the specific station sends an authentication request frame to the access point after the association with the access point is terminated.

10. The wireless network system according to claim 9, wherein the wireless intrusion prevention system sends a deauthentication frame to the access point or the specific station after the authentication request frame is sent.

11. The wireless network system according to claim 1, wherein the specific station is a station connected to an unauthorized station or an unauthorized attacker over a network.

12. The wireless network system according to claim 1, wherein the wireless network includes IEEE 802.11w technology.

13. A method for operating a wireless network system, comprising:
   maintaining, by an access point, an association with a specific station, among a plurality of stations configured to transmit/receive a wireless frame to/from the access point over a wireless network; and
   transmitting, by a wireless intrusion prevention system configured to monitor the wireless frame, an interference signal which prevents the access point from responding to the specific station or te prevents the access point from transmitting a protected query to the specific station when there is a failure of a two-way exchange of protected communications between the specific station and the access point.

14. The method according to claim 13, further comprising:
   transmitting, by the wireless intrusion prevention system configured to monitor the wireless frame, a dis-association request to the specific station;
   transmitting, by the specific station, a protected query to the access point;
   instructing, by the specific station, the access point to respond to the protected query within a predetermined first time; and
   when no response is received within the first time, terminating, by the specific station, an association with the access point.

15. The method according to claim 14, further comprising:
   after the association with the access point is terminated, sending, by the specific station, an authentication request frame to the access point; and
   after the authentication request frame is sent, sending, by the wireless intrusion prevention system, a deauthentication frame to the access point or the specific station.

16. The method according to claim 13, further comprising:
   transmitting, by the specific station, an access request to the access point,
   wherein the interference signal includes a signal for preventing the access point from transmitting an access request denial to the specific station or preventing the access point from transmitting the protected query to the specific station.

17. The method according to claim 13, further comprising:
    transmitting, by the wireless intrusion prevention system, an access request to the access point,
    wherein the interference signal includes a signal for preventing the access point from transmitting the protected query to the specific station.

18. A wireless intrusion prevention system, comprising:
    a sensing device configured to monitor a wireless frame that is transmitted/received between an access point and a plurality of stations over a wireless network and to process information based on the wireless frame; and
    a server configured to determine whether the access point and the plurality of stations are unauthorized and are operating abnormally, based on the processed information,
    wherein the wireless intrusion prevention system comprises a function of providing an interference signal for terminating an association of a specific station, among the plurality of stations, with the access point when there is a failure of a two-way exchange of protected communications between the specific station and the access point.

19. The wireless intrusion prevention system according to claim 18, further comprising:
    a function of sending a deauthentication frame to the access point or the specific station when the specific station sends an authentication request frame to the access point so as to request access to the access point.

20. The wireless intrusion prevention system according to claim 18, wherein the interference signal includes a signal for preventing the access point from responding to the specific station or from transmitting a protected query to the specific station.

* * * * *